US008204461B2

(12) United States Patent
Sasaki

(10) Patent No.: US 8,204,461 B2
(45) Date of Patent: Jun. 19, 2012

(54) DIGITAL RADIO RECEIVER AND METHOD OF REPRODUCING ACOUSTIC INFORMATION

(75) Inventor: Yoshio Sasaki, Kanagawa (JP)

(73) Assignee: Sony Corporation (JP)

(*) Notice: Subject to any disclaimer, the term of this patent is extended or adjusted under 35 U.S.C. 154(b) by 633 days.

(21) Appl. No.: 12/380,363

(22) Filed: Feb. 26, 2009

(65) Prior Publication Data

US 2009/0213962 A1 Aug. 27, 2009

(30) Foreign Application Priority Data

Feb. 27, 2008 (JP) ................................ P2008-046563

(51) Int. Cl.
*H04B 1/18* (2006.01)
(52) U.S. Cl. ................................................ 455/186.1
(58) Field of Classification Search ................ 455/186.1
See application file for complete search history.

(56) References Cited

U.S. PATENT DOCUMENTS

2004/0032805 A1* 2/2004 Schade-Buensow et al. .......................... 369/47.33

FOREIGN PATENT DOCUMENTS

| | | | |
|---|---|---|---|
| JP | 04-014968 | A | 1/1992 |
| JP | 11-122199 | A | 4/1999 |
| JP | 2004-080275 | A | 3/2004 |
| JP | 2006-140783 | A | 6/2006 |
| JP | 2006-323942 | A | 11/2006 |
| JP | 2007-110244 | A | 4/2007 |
| JP | 2007-202189 | A | 8/2007 |

* cited by examiner

*Primary Examiner* — Lincoln Donovan
*Assistant Examiner* — Daniel Rojas
(74) *Attorney, Agent, or Firm* — Lerner, David, Littenberg, Krumholz & Mentlik, LLP

(57) ABSTRACT

A digital radio receiver for receiving information on a piece of music that is identification information for specifying content of digital acoustic information, the identification information being broadcast together with the digital acoustic information is provided. The digital radio receiver includes an internal memory configured to store the information on the piece of music; an operation unit configured to set a timing at which the information on the piece of music is stored in the internal memory; a display unit configured to display the information on the piece of music; and a controller configured to perform a process for storing the information on the piece of music in the internal memory in response to the operation of the operation unit.

8 Claims, 6 Drawing Sheets

FIG. 4

1. 12/AUG/07 AAAAAAAA / BBBBBBB

FIG. 5

| | DATE | SONG TITLE | | ARTIST |
|---|---|---|---|---|
| 1. | 12/AUG/07 | AAAAAAAA | / | BBBBBBB |
| 2. | 10/AUG/07 | CCCCCCCC | / | DDDDDDD |
| 3. | 20/JUL/07 | EEEEEEEE | / | FFFFFFF |
| 4. | 15/JUL/07 | GGGGGGGG | / | HHHHHHH |
| 5. | 15/JUL/07 | I I I I I I I I | / | JJJJJJ |

DIGITAL RADIO RECEIVER AND METHOD OF REPRODUCING ACOUSTIC INFORMATION

CROSS REFERENCES TO RELATED APPLICATIONS

The present application claims priority from Japanese Patent Application No. JP 2008-046563, filed in the Japanese Patent Office on Feb. 27, 2008, the entire content of which is incorporated herein by reference.

BACKGROUND OF THE INVENTION

1. Field of the Invention

The present invention relates to a digital radio receiver and a method of reproducing acoustic information.

2. Description of the Related Art

In recent years, digital radio broadcasting (HD-RADIO) has started in the United States. In such digital radio broadcasting, for example, programs of several tens to more than 100 channels are broadcast at the same time by using a satellite. In a digital radio receiver that receives a digital radio broadcast, similarly to a radio broadcast of the related art, it is possible to select a channel desired by a user and listen to it. Furthermore, in a satellite digital radio broadcast, program additional information is sent together with information on music data and the like. The program additional information contains, in addition to the channel number and the channel name of a program, information, such as the title of a piece of music, the artist name, a genre, and an elapsed time (the elapsed time from the beginning of a piece of music) while, for example, music is being broadcast (see, for example, Japanese Patent No. 4014968).

Furthermore, there has been proposed a digital radio receiving apparatus, in which a digital radio receiver that receives such a digital radio broadcast and a hard disk drive (HDD) are formed as one unit, the digital radio receiving apparatus being capable of recording information being received, such as music data, in addition to reception (see, for example, Japanese Unexamined Patent Application Publication No. 2007-110244).

SUMMARY OF THE INVENTION

Such a digital radio receiving apparatus having a hard disk drive has the convenience of being capable of receiving music data and the like and also recording it. When the apparatus is to be miniaturized, there are constraints on the amount of information that can be recorded. Also, when the apparatus is made to be capable of recording information freely, there is a case in which copyright may be infringed.

It is desirable to provide a compact digital radio receiver. It is also desirable to provide a method of obtaining desired music information and the like and of reproducing acoustic information in which copyright is taken into consideration when necessary.

According to an embodiment of the present invention, there is provided a digital radio receiver for receiving information on a piece of music that is identification information for specifying content of digital acoustic information, the identification information being broadcast together with the digital acoustic information, the digital radio receiver including: an internal memory configured to store the information on the piece of music; an operation unit configured to set a timing at which the information on the piece of music is stored in the internal memory; a display unit configured to display the information on the piece of music; and a controller configured to perform a process for storing the information on the piece of music in the internal memory in response to the operation of the operation unit.

According to another embodiment of the present invention, there is provided a method of receiving information on a piece of music that is identification information for specifying content of digital acoustic information, the identification information being broadcast together with the digital acoustic information, and reproducing the digital acoustic information, the method including the steps of: receiving a broadcast using a digital radio receiver and decoding the information on the piece of music; storing the information on the piece of music in the internal memory of the digital radio receiver at a timing determined by a user of the digital radio receiver; moving the information on the piece of music stored in the internal memory to an acoustic information downloading device; communicating with a server of a provider of the digital acoustic information via an Internet line on the basis of the information on the piece of music and downloading digital acoustic information specified by the information on the piece of music from the server, by using the acoustic information downloading device; and reproducing the downloaded digital acoustic information.

According to an embodiment of the present invention, it is possible to provide a compact digital radio receiver capable of obtaining desired information on the piece of music. According to another embodiment of the present invention, it is possible to provide a method of obtaining acoustic information on the basis of information on the piece of music after the information on the piece of music is obtained.

BRIEF DESCRIPTION OF THE DRAWINGS

FIG. 4 shows an example of a one-line display shown on a liquid-crystal screen provided in a display unit;

FIG. 5 shows an example of a list display shown on a liquid-crystal screen provided in a display unit;

DESCRIPTION OF THE PREFERRED EMBODIMENTS

Figure 1:
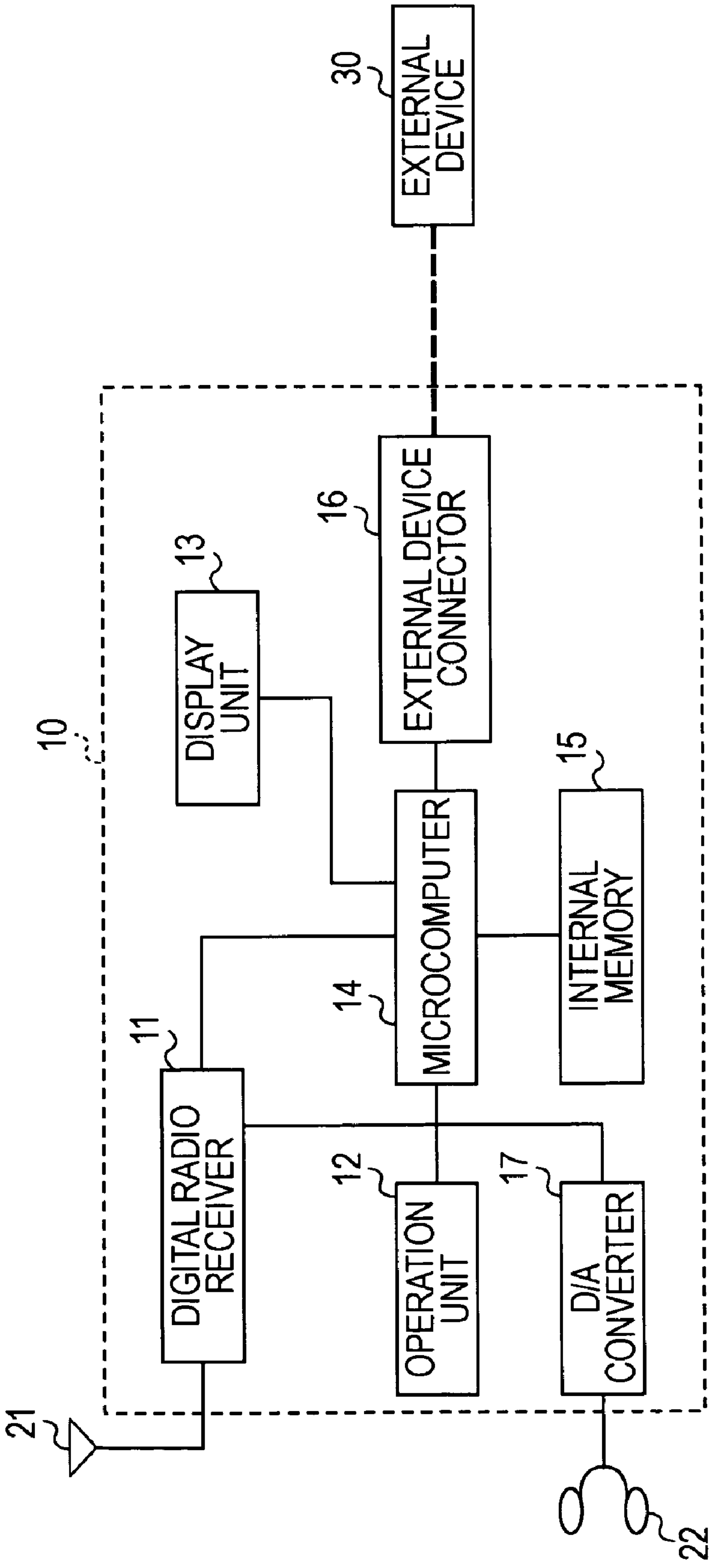
FIG. 1 is a block diagram of a digital radio receiver according to an embodiment of the present invention.

A digital radio receiver according to an embodiment of the present invention is a digital radio receiver for receiving information on pieces of music functioning as identification information for specifying content of digital acoustic information, the identification information being broadcast together with the digital acoustic information. The digital radio receiver includes an internal memory for storing information on pieces of music, an operation unit for performing setting of the operating state of the digital radio receiver and setting a timing at which a flag is attached to information on the piece of music recorded in the internal memory, and a controller for performing a process for storing the information on pieces of music in the internal memory.

Here, the information on the piece of music is digital information that is attached to acoustic information and broadcast for the purpose of specifying the content of the acoustic information, and the acoustic information corresponding to the information on the piece of music is specified by only the information on the piece of music. The operating states of the digital radio receiver set by the operation unit include various states, such as a receiving frequency, a sound volume, content to be displayed on the display unit, and a decoding method. Furthermore, by using the operation unit, a timing at which information regarding a piece of music is stored in the internal memory is set, and the setting of the timing can be performed using, for example, a button provided in the operation unit. The display unit is configured to include, for example, a liquid-crystal display section, an organic EL display section, or the like so that visual recognition is possible by the sense of vision (eyes) by a user. The internal memory may be formed by a non-volatile memory, and may also be formed by a volatile memory backed up using a battery in the case that only information on pieces of music is to be stored in the internal memory. Furthermore, the controller may be formed by dedicated digital hardware, for example, a microcomputer (CPU), and may also be formed as a one-chip microcomputer in which a memory for storing software that causes a microcomputer to be operated is stored in the same chip.

In the digital radio receiver according to the embodiment of the present invention, with such a configuration, only the information on the piece of music having a comparatively small storage size is stored in the internal memory so that the digital radio receiver is miniaturized. Furthermore, the digital radio receiver can also be provided with a headphone so that acoustic information that is currently being broadcast, for example, music information, can be listened to in real time. Also, in this case, acoustic information itself is not stored in the digital radio receiver. As a consequence, it is not possible for the user to use acoustic information in other than the case where the acoustic information is listened to in real time. This makes it possible to protect copyright related to the acoustic information.

The method of reproducing acoustic information according to the embodiment is a method of receiving information on pieces of music that is identification information for specifying the content of digital acoustic information that is broadcast together with the digital acoustic information and reproducing the digital acoustic information. A broadcast is received using a digital radio receiver, and the information on the piece of music is decoded. The information on the piece of music is stored in an internal memory of the digital radio receiver at a timing determined by the user of the digital radio receiver. The information on the piece of music stored in the internal memory is moved to an acoustic information downloading device. An acoustic information downloading device performs communication with the server of the provider of the digital acoustic information via an Internet line on the basis of the information on the piece of music, downloads the digital acoustic information specified by the information on the piece of music from the server, and reproduces the downloaded digital acoustic information.

Here, the acoustic information downloading device may be configured in such a manner that an ordinary personal computer is used as an acoustic information downloading device, or an acoustic information downloading device is formed as a dedicated Internet terminal. Furthermore, when information on the piece of music is to be moved from the internal memory to the acoustic information downloading device, it may be directly moved and may also be moved via an external device. The external device functions as a medium for moving information on the piece of music stored in the internal memory to the acoustic information downloading device, and has a storage medium, such as a non-volatile memory. An information communication method for moving information on the piece of music from the digital radio receiver to the acoustic information downloading device may be such that they are connected with each other in a wired manner and disconnected after the communication is completed, or may be such that information is communicated with each other by using a wireless LAN or the like. Furthermore, an information communication method for moving information on the piece of music from the digital radio receiver to an external device or from an external device to the acoustic information downloading device may be such that they are connected with each other in a wired manner and disconnected after the communication is completed, or may be such that information is communicated with each other by using a wireless LAN or the like.

Since the acoustic information is reproduced in accordance with such a procedure, if the acoustic information downloading device obtains only the information on the piece of music, it is possible to easily download the acoustic information specified by the information on the piece of music to the acoustic information downloading device. It is also possible to directly download, via the acoustic information downloading device, the acoustic information specified by the information on the piece of music to the digital radio receiver that can be carried in such a manner that the function of the external device and the function of the digital radio receiver are formed integrally. Here, since the provider of the acoustic information can charge when the downloading is to be permitted, it is possible to provide acoustic information, such as music, to the user while protecting copyright.

A description will be given below in detail, with reference to the figures, of a digital radio receiver and a method for reproducing acoustic information according to embodiments of the present invention.

FIG. 1 is a block diagram of a digital radio receiver according to an embodiment of the present invention. A digital radio receiver 10 includes a digital radio receiving unit 11, an operation unit 12, a display unit 13, a microcomputer 14 that functions as a controller, an internal memory 15, an external device connector 16, and a D/A converter 17.

The digital radio receiving unit 11 receives radio waves via an antenna 21 connected to the digital radio receiving unit 11, for example, receives a digital radio broadcast, such as HD-RADIO whose broadcast has started in the United States. It is also possible for the digital radio receiving unit 11 to receive not only acoustic information, for example, audio signals, but also data containing information regarding acoustic information. Examples of information regarding acoustic information include a music title that is being broadcast, an artist name, an album title, an ID uniquely determined for each piece of music, and the Internet connection information on the provider, and these can also be received. Furthermore, there is a case in which, in addition to information on a piece of music, information on the name of the broadcast station, the broadcast frequency, and information regarding a program name or the like are broadcast. Since such information is information that specifies a broadcast, it is called broadcast information. Furthermore, a combination of the information on the piece of music and the broadcast information is called associated information.

The digital radio receiving unit 11 includes a front end for allowing necessary radio waves among the radio waves received by the antenna to reach an appropriate level, a demodulator for demodulating a signal (for example, an ODFM signal) from the front end, and a decoding unit for decoding a signal from the demodulator. The decoding unit decodes the compressed acoustic information, and also decodes additional information (information on a piece of music, program information, etc), and outputs the result to the microcomputer 14. The communication line with the microcomputer 14 is often formed in such a manner that a signal for controlling the digital radio receiving unit 11 is communicated from the microcomputer 14.

The operation unit 12 is a unit used to operate the digital radio receiver 10 and functions as a man/machine interface. For example, it is possible, using the operation unit 12, to change a radio receiving station to be received and operate the sound volume. By pressing a recording button arranged in the operation unit when the user is fond of the music being broadcast, it is possible to store the information regarding a piece of music in the internal memory.

The display unit 13 is a display device for displaying the state of the digital radio receiver 10, received data, and the like, and is formed as, for example, a liquid-crystal display device. On the liquid-crystal display device, information regarding a piece of music (for example, the title of a piece of music, an artist name, an album title (or program information), an ID uniquely determined for each piece of music, Internet connection information on the provider, etc.), broadcast information (for example, the name of a broadcast station, a broadcast frequency, a program name), and part or whole of associated information containing both the music information and the broadcast information can be displayed. In addition, the states of the digital radio receiver 10, for example, the sound volume setting, the sound quality setting, and the like can be displayed.

The microcomputer 14 functions as a control unit for controlling the digital radio receiver 10. The microcomputer 14 receives a signal from the operation unit 12, controls the internal memory 15, performs display on the display unit 13, and sends data to the external device connector 16. Furthermore, the additional information decoded by the digital radio receiving unit 11 is also received and processed by the microcomputer 14.

The internal memory 15 is used to store information associated with a received piece of music. Furthermore, the internal memory 15 also functions as an auxiliary storage device for the microcomputer and has stored therein programs necessary to operate the digital radio receiver 10. There is a case in which the functions of the auxiliary storage device are incorporated in the microcomputer, and these are combined to be formed as a one-chip microcomputer.

The external device connector 16 is a connector for connecting an external device 30 to the digital radio receiver 10 when information is to be moved. As the external device 30, various forms are possible, as long as at least information regarding a piece of music can be recorded. The external device 30 will be described in more detail later.

The D/A converter 17 is used to convert digital acoustic information decoded by the digital radio receiving unit 11 into analog acoustic information, and supplies it to a headphone 22. In the digital radio receiver 10 according to the present embodiment, the D/A converter 17 and the headphone 22 are provided so that a user can listen to acoustic information which can then be stored in the internal memory 15 at the time of listening if so desired. Therefore, these are not necessary in the case that necessary information associated acoustic information is to be stored in the internal memory 15 without the user listening to the acoustic information at the time of broadcast. In the case that the D/A converter 17 and the headphone 22 are provided, it is possible to store in the internal memory 15 necessary information based on this acoustic information. Furthermore, in the case that the D/A converter 17 and the headphone 22 are not provided, it is possible to store in the internal memory 15 necessary information based on the information on the piece of music displayed on the liquid-crystal display of the display unit 13.

Figure 2:
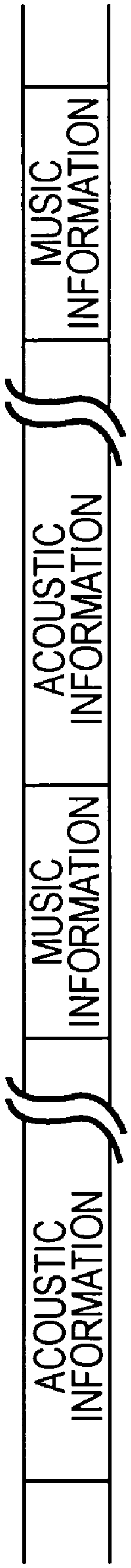
FIG. 2 shows the arrangement of acoustic information and information on pieces of music in a time-series manner.

FIG. 2 shows how acoustic information and information regarding a piece of music are received in time series by using radio waves as a medium. It is common practice that information on a piece of music is inserted during the time in which acoustic information is being received, and the acoustic information is received for a longer time. When broadcast information is to be transmitted, broadcast information is transmitted in conjunction with the information regarding a piece of music. That is, the acoustic information and the information regarding a piece of music are broadcast on a time-division basis.

Figure 3:
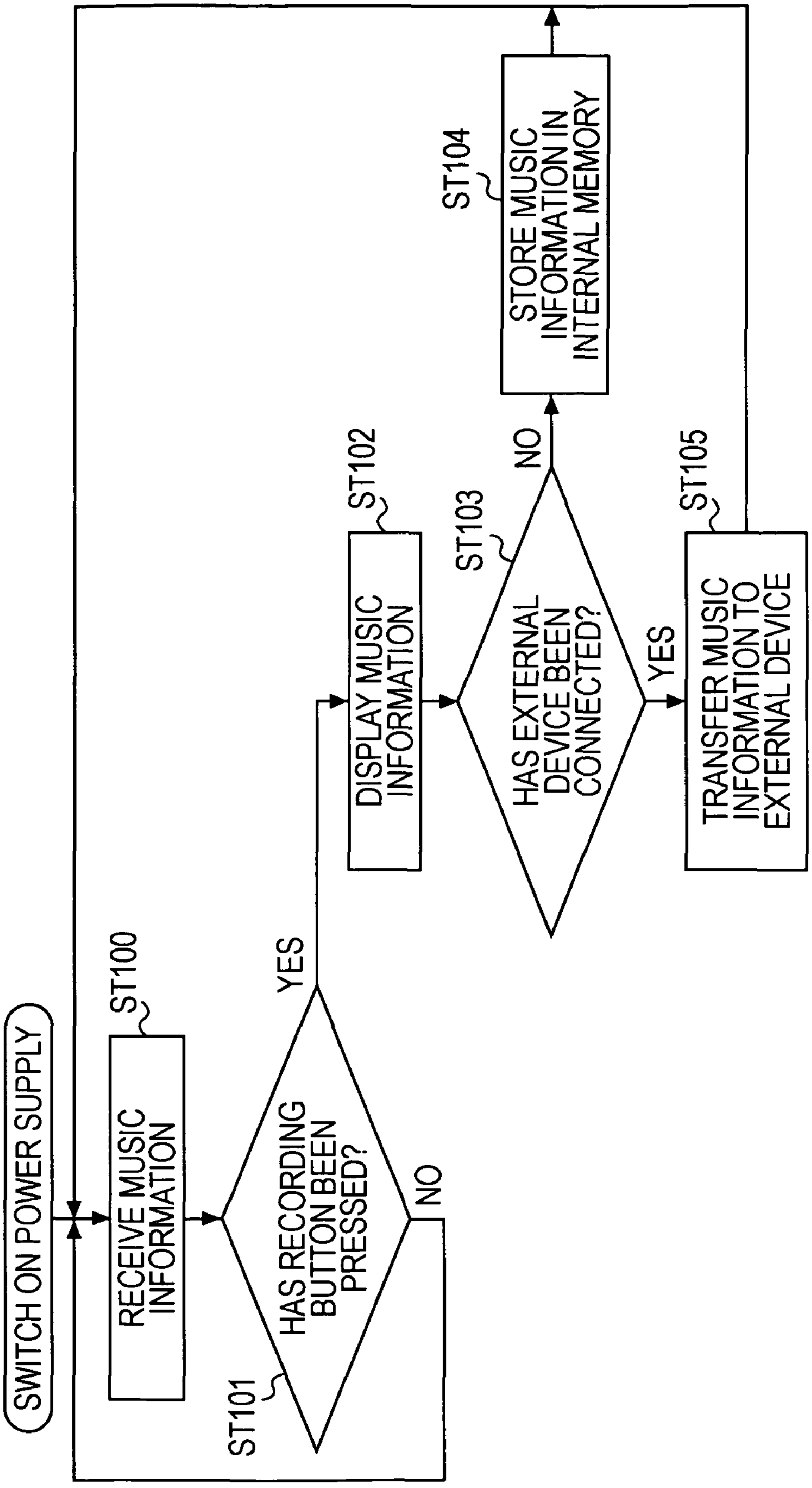
FIG. 3 is a flowchart of the operation of the digital radio receiver.

FIG. 3 is a flowchart showing how the digital radio receiver 10 operates. A description of this flowchart will be given with emphasis on processing performed by the microcomputer 14.

After the power supply is switched on, in step ST100, information on a piece of music associated with a piece of music that is currently being broadcast is received. More specifically, after the information on the piece of music is received by the digital radio receiving unit 11, the microcomputer 14 decodes the information on the piece of music (for example, the piece of music title, an artist name, the ID of a piece of music, Internet connection information on the provider, etc.).

In step ST101, it is determined whether or not the recording button of the operation unit 12 is pressed while the information regarding a piece of music is being received. Here, the recording button is a button for, when pressed, sending, to the microcomputer 14, a signal with which a timing for recording in the internal memory 15 is supplied. When the determination result in step ST101 is affirmative (Yes), the process proceeds to step ST102, and when the determination result is negative (No), the process proceeds to step ST100 again.

In step ST102, the information on the piece of music is displayed. It is possible to confirm whether or not appropriate information on a piece of music desired by the user has been obtained as a result of the recording button being pressed. The manner in which the information on the piece of music is displayed will be described later. After a command for displaying the information on the piece of music is sent to the display unit 13, the process proceeds to step ST103.

In step ST103, it is determined whether or not the external device 30 has been connected. The determination of whether or not the external device 30 has been connected can be performed by various techniques. For example, a command for confirming the connection may be sent to the external device 30, and it may be detected whether or not a response therefor is returned from the external device 30. For example, a push switch may be provided in the vicinity of the external device connector 16, so that the pressing of the push switch by the external device 30 makes it possible to confirm that the external device 30 has been connected.

When the determination result in step ST103 is affirmative (Yes), the process proceeds to step ST105, and when the determination result is negative (No), the process proceeds to step ST104.

In step ST104, the information on the piece of music is stored in the internal memory 15. This is because when the external device 30 has been connected, the information on the piece of music can be directly sent to the external device 30. However, when the external device 30 has not been connected, it is difficult to transfer the information on the piece of music. Therefore, it is necessary to maintain the information on the piece of music to be stored until the external device 30 is connected to the internal memory 15.

After the processing in step ST104 is completed, the process returns to step ST100 again.

On the other hand, in step ST105, the information on the piece of music is transferred to the external device 30. The reason for this is that since the information on the piece of music can be directly sent to the external device 30 in the case that the external device 30 has been connected, it is not necessary to store the information on the piece of music in the internal memory 15. However, also, in the case that the external device 30 has been connected, it is also possible to store, as desired, all the information on pieces of music at the time when the recording button is pressed in the internal memory 15.

After the processing in step ST105 is completed, the process returns to step ST100 again.

Next, a description will be given, with reference to FIGS. 4 and 5, of how information on pieces of music is displayed on the display unit 13.

In the case that the external device 30 has been connected, the information on the piece of music at the time when the recording button was pressed last is displayed by the time the recording button is pressed again is displayed (one-line display), so that the fact that the information on the piece of music was correctly transferred to the external device 30 can be confirmed. When necessary, the microcomputer 14 performs transmission and reception (verifying operation) of information with the external device 30, and can perform a special display for confirming that the recording button was correctly pressed and an appropriate information on the piece of music was obtained, and also the information on the piece of music was correctly transferred, for example, can perform display by changing the colors of the display.

In the case that the external device 30 has not been connected, the information on the piece of music at the time when the recording button was pressed last is displayed until the recording button is pressed again is displayed (one-line display), so that the fact that the information on the piece of music was correctly transferred to the external device 30 can be confirmed. Here, in the case that the user wants to obtain desired information on a piece of music without hearing acoustic information, such as music, with the headphone 22, after the recording button is pressed, the obtained information on the piece of music may be displayed for only a predetermined time period. Thereafter, the information on the piece of music that is currently being received may be sequentially displayed, so that the information on pieces of music at a timing for pressing the recording button can be continued to be displayed.

FIG. 4 shows an example of a one-line display shown on the liquid-crystal display provided in the display unit 13. In FIG. 4, the information on each piece of music regarding recording date and time (e.g., 12/AUG/07), the music title (e.g., AAAAAAAA), and the artist name (e.g., BBBBBBB) is shown in sequence starting from the left side.

On the other hand, in the case that the recording button is pressed a plurality of times before the external device 30 is connected, a plurality of pieces of information on pieces of music corresponding to the number of times the recording button has been pressed until then have been recorded in the internal memory 15. Each time the recording button is pressed, these pieces of information on pieces of music are updated and are displayed in a list form (list display).

FIG. 5 shows an example of a list display shown on the liquid-crystal display provided in the display unit 13. In FIG. 5, the information on each piece of music regarding the recording date and time (e.g., 12/AUG/07), the music title (e.g., AAAAAAAA), and the artist name (e.g., BBBBBBB), which are information regarding one piece of music, is shown in sequence starting from the left side. In the second line in the vertical direction, the information on each piece of music regarding the recording date and time (e.g., 10/AUG/07), the music title (e.g., CCCCCCCC), and the artist name (e.g., DDDDDDD), which are information regarding another piece of music, is shown. Similarly, in the third line, the information on each piece of music regarding the recording date and time (e.g., 20/JUL/07), the music title (e.g., EEEEEEEE), and the artist name (e.g., FFFFFFF) is shown. Similarly, in the fourth line, the information on each piece of music regarding on the recording date and time (e.g., 15/JUL/07), the music title (e.g., GGGGGGGG), and the artist name (e.g., HHHHHHH) is shown. Similarly, in the fifth line, the information on each piece of music regarding on the recording date and time (e.g., 15/JUL/07), the music title (e.g., IIIIIII), and the artist name (e.g., JJJJJJJ) is shown.

If setting is performed in advance in the microcomputer 14 using the operation unit 12 so that such a list display is performed, such a display is automatically performed in step ST102 above. Furthermore, another display mode can also be set in advance from the operation unit 12. Another setting is such that a one-line display is made also when there are a plurality of pieces of information on pieces of music in the internal memory 15, and other pieces of data are viewed in sequence one line by one line.

In the case that any one of the one-line display and the list display is adopted, by visually recognizing the displayed information on the piece of music, the user can confirm whether or not the information on the piece of music corresponding to the piece of music to be stored by the user is really information on a correct piece of music and can further confirm whether or not the information on the piece of music has been correctly stored in the internal memory 15. It is further possible to confirm whether or not the information on the piece of music has been correctly stored in the external device 30.

In the case that there are constraints on the storage capacity of the internal memory 15, it is possible to confirm as to the number of the pieces of information on pieces of music that can be stored in the internal memory 15 at the present time. This process for determining the remaining storage capacity can be performed by the microcomputer 14. When the external device 30 has been connected, in the case that when the number of the information on pieces of music that can be stored in the external device 30 is recognized, the confirmation as to the number of pieces of information on pieces of music that can be stored in the external device 30 at the present time is made possible by the external device 30 and the microcomputer 14 by communicating with each other.

Then, finally, the information on pieces of music stored in the internal memory 15 is moved to the external device 30, and all the pieces of information on pieces of music corresponding to the acoustic information that had been broadcast at the time when the recording button was pressed are stored in the external device 30.

The external device 30 will be described below. Various forms of the external device 30 are possible. By considering portability, the external device 30 can be miniaturized as a non-volatile storage device having only the function (memory function) of storing only information on pieces of music for the purpose of simply recording information on pieces of music.

Figure 6:
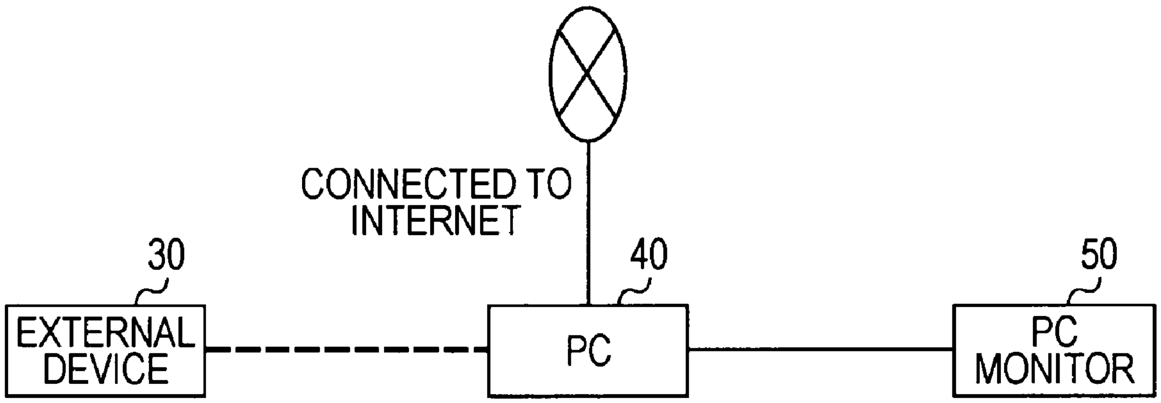
FIG. 6 illustrates a method of reproducing acoustic information according to another embodiment of the present invention.

FIG. 6 illustrates a method of reproducing acoustic information in the embodiment, that is, how information on a piece of music obtained by the digital radio receiver 10 is used. The external device 30 (also described in FIG. 1), a personal computer (PC) 40, and a PC monitor 50, which are shown in FIG. 6, constitute an acoustic information downloading device. A description will be given below, with reference to FIG. 6, of how information on a piece of music stored in the external device 30 is used.

The personal computer 40 is connected to the Internet. The PC monitor 50 formed of a liquid-crystal display or the like is connected to the personal computer 40. The external device 30 can be loaded to and unloaded from the personal computer 40 via an external device interface. The personal computer 40 and the PC monitor 50 may also be an acoustic information downloading device formed in such a manner as to be one unit.

When the external device 30 is inserted into the external device interface of the personal computer 40, the personal computer 40 detects that the external device 30 has been inserted, starts an acoustic information downloading program, or starts an acoustic information downloading program by a manual operation, and downloads digital acoustic information specified by the information on the piece of music to the personal computer 40 in accordance with a predetermined procedure. This digital acoustic information is, in principle, the same as the digital acoustic information that is broadcast and such that information on a piece of music is obtained by the digital radio receiver 10. In the case that the external device has been configured as a portable information recording and reproduction terminal device, the portable information recording and reproduction terminal device downloads acoustic information via the personal computer 40.

Downloading is specifically performed, for example, in accordance with the following procedure. Information on a list of pieces of music stored in the external device 30 is displayed on the PC monitor 50. The user specifies a target to be downloaded by putting a check mark in only the information on the piece of music corresponding to the acoustic information desired to be downloaded by the user himself/herself among the pieces of information on pieces of music. Thereafter, a display (soft switch) that permits the transmission of these items of information to the server of the corresponding acoustic information provider via the Internet is clicked.

The personal computer 40 makes connection with a predetermined connection destination, that is, the acoustic information provider, on the basis of the address of the Internet connection destination, which is contained in the information on the piece of music or the associated information, and makes a request for downloading the corresponding acoustic information. In response, when the acoustic information provider (the server of the acoustic information provider) charges the user on the basis of the copyright, the acoustic information provider sends back the fee thereof, the method of withdrawing the corresponding acoustic information, and the like to the personal computer 40. At this time, the name of the broadcast station received by the user and the date and time of the reception are contained in the associated information, and the name of the broadcast station received by the user, and the date and time of the reception are stored in the server of the acoustic information provider, so that these items of information can be used by the acoustic information provider for the purpose of a market research.

In the case that the user approves the charging, a soft switch displayed on the PC monitor 50, which is used to notify the acoustic information provider of the approval, is clicked, thereby starting the downloading of the acoustic information in the storage device of the personal computer 40. In the case that the external device is configured as a portable information recording and reproduction terminal device, acoustic information may also be directly downloaded to the portable information recording and reproduction terminal device via the personal computer 40.

In the manner described above, the user decodes the information on the piece of music in which a broadcast is received by the digital radio receiver 10 and stores the information on the piece of music in the internal memory 15 by pressing the recording button at a desired timing of the user, and moves the information on the piece of music stored in the internal memory 15 to the personal computer (PC) 40 that functions as an acoustic information downloading device. On the basis of the Internet connection information for making connection through the Internet with the provider of the digital acoustic information contained in the information on the piece of music, the personal computer 40 communicates with the server of the provider of the digital acoustic information via the Internet line, making it possible to download digital acoustic information specified using information on a piece of music from the server.

Furthermore, it is possible for the user to reproduce the acoustic information downloaded to the personal computer 40 by using an audio device connected to the personal computer 40 and enjoy it. Furthermore, after the acoustic information is downloaded to the connected portable information recording and reproduction terminal device from the personal computer 40, it is possible to reproduce the acoustic information using the portable information recording and reproduction terminal device and enjoy it. In the case that acoustic information is to be directly downloaded to the portable information recording and reproduction terminal device via the personal computer 40, the portable information recording and reproduction terminal device can be disconnected from the personal computer 40, and it is possible to reproduce and enjoy the acoustic information while the device is carried.

Figure 7:
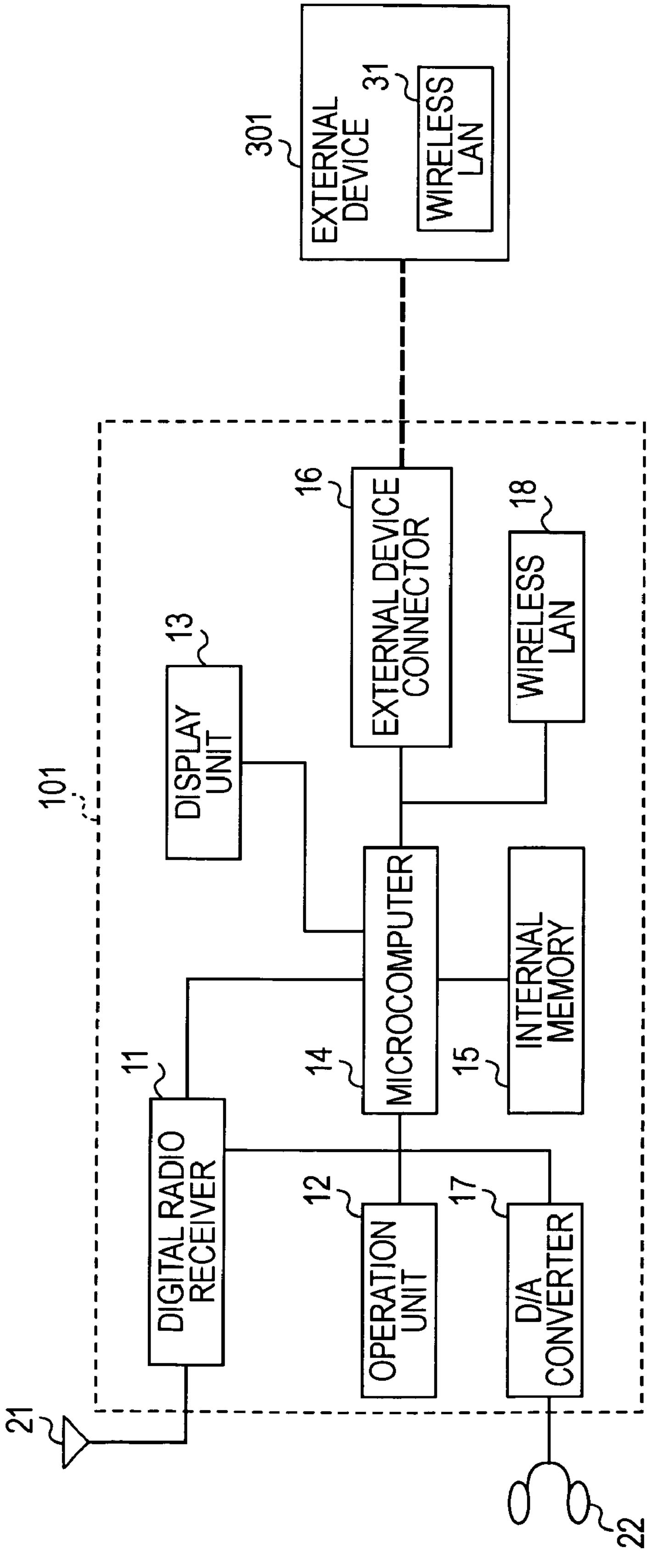
FIG. 7 is a block diagram of a digital radio receiver according to another embodiment of the present invention.

FIG. 7 is a block diagram of a digital radio receiver 101 according to a modification of the embodiment. The digital radio receiver 101 includes, in addition to each unit possessed by the digital radio receiver 10, a wireless LAN 18. Similarly, an external device 301 is also provided with a wireless LAN 31 in correspondence with such a digital radio receiver 101. With such a configuration, even if a configuration not having the external device connector 16 is adopted, it is possible for the digital radio receiver 101 to make communication with the external device 301.

Each time the recording button of the operation unit 12 of the digital radio receiver 101 is pressed, the microcomputer 14 recognizing the pressing detects information on a piece of music sent from the digital radio receiving unit 11, and sends the information on the piece of music to the wireless LAN 31 of the external device 301 via the wireless LAN 18.

The wireless LAN 31 stores information on a piece of music that functions as meta-information (token) with which the target acoustic information can be identified in a non-volatile memory (for example, an EEPROM) of the external device 301. In the manner described above, it is possible to sequentially record information on pieces of music in the external device 301, for example, while listening to music or the like with a headphone 22.

Here, when the size of the meta-information approaches a limit at which it can be stored in the non-volatile memory of the external device 301 or when the limit at which the meta-information can be stored in the non-volatile memory is exceeded, the external device 301 can give a warning to the digital radio receiver 101 so that the external device 301 is mounted in the personal computer 40, the external device 301 is connected to the personal computer 40, those pieces of information on pieces of music are moved, and the available capacity of the non-volatile memory in the external device 301 is increased. This warning may appeal to the sense of hearing as an acoustic signal using sound or the like for the headphone 22 or may appeal to the sense of vision using a liquid-crystal display for the display unit 13, or the like.

Furthermore, a multi-functional product in which one of the digital radio receiver 10 and the digital radio receiver 101 and one of the external device 30 and the external device 301 are combined can also be configured as a digital radio receiver. In this case, the product can be made to be a product that has the functions of either the digital radio receiver 10 or the digital radio receiver 101 and that has the functions of either the external device 30 or the external device 301. The product, as a digital radio receiver, receives a radio broadcast and can also store information on pieces of music and associated information. Thus, the acoustic information that has already been stored can be listened to via the headphone provided in the digital radio receiver.

Furthermore, the external device 301 may be used in place of the external device 30, the personal computer 40 is also provided with a wireless LAN, and communication between them is performed by using radio waves as a medium, thereby making it possible to save connection time and effort.

The external device incorporate a non-volatile memory in the manner described above. The external device may take the form of a portable information recording and reproduction terminal device in which an acoustic information downloading interface device for downloading acoustic information specified by the information on the piece of music via the acoustic information downloading device, an acoustic information recording device for storing the acoustic information, and an acoustic information reproduction apparatus for decoding the stored acoustic information, performing D/A conversion thereon, and enabling the user to listen to an acoustic signal using a headphone or the like in the end are included as one unit.

Furthermore, the external device may be configured as the above-described portable information recording and reproduction terminal device and may also be configured as a digital radio receiver having both the functions possessed by the portable information recording and reproduction terminal device and the functions possessed by the digital radio receiver 10. In this case, it is possible to directly move information regarding a piece of music to the acoustic information downloading device from the digital radio receiver without the intervention of an intermediary, such as the external device 30.

It should be understood by those skilled in the art that various modifications, combinations, sub-combinations and alterations may occur depending on design requirements and other factors insofar as they are within the scope of the appended claims or the equivalents thereof.

What is claimed is:

1. A digital radio receiver for receiving information on a piece of music that is identification information for specifying content of digital acoustic information, the identification information being broadcast together with the digital acoustic information, the digital radio receiver comprising:

an internal memory configured to store the information on the piece of music;

an operation unit configured to set a timing at which the information on the piece of music is stored in the internal memory;

a display unit configured to display the information on the piece of music; and a controller configured to perform a process for storing the information on the piece of music in the internal memory in response to the operation of the operation unit, such that only the information on the piece of music is stored in response to the operation of the operation unit, and no acoustic information is stored in response to the operation of the operation unit.

2. The digital radio receiver according to claim 1, wherein, when there are a plurality of pieces of information on pieces of music set in the internal memory, the display unit displays the plurality of pieces of information on pieces of music at the same time.

3. The digital radio receiver according to claim 1, wherein, when there are a plurality of pieces of information on pieces of music set in the internal memory, the display unit sequentially displays the plurality of pieces of information on pieces of music.

4. The digital radio receiver according to claim 1, further comprising an acoustic information memory in which the acoustic information is stored on the basis of the information on the piece of music stored in the internal memory, wherein the stored acoustic information is reproduced.

5. The digital radio receiver according to claim 1, further comprising an external device connector for making connection with an external device and sending the information on the piece of music stored in the internal memory to the external device.

6. The digital radio receiver according to claim 1, further comprising a wireless local area network through which connection is made with an external device via radio waves and sending the information on the pieces of music stored in the internal memory.

7. A method of receiving information on a piece of music that is identification information for specifying content of digital acoustic information, the identification information being broadcast together with the digital acoustic information, and reproducing the digital acoustic information, the method comprising the steps of:

receiving a broadcast using a digital radio receiver and decoding the information on the piece of music;

storing the information on the piece of music in the internal memory of the digital radio receiver at a timing determined by a user of the digital radio receiver, such that only the information on the piece of music is stored at the timing determined by the user, and no acoustic information is stored at the timing determined by the user;

moving the information on the piece of music stored in the internal memory to an acoustic information downloading device;

communicating with a server of a provider of the digital acoustic information via an Internet line on the basis of the information on the piece of music and downloading digital acoustic information specified by the information on the piece of music from the server, by using the acoustic information downloading device; and reproducing the downloaded digital acoustic information.

8. The method of reproducing acoustic information according to claim 7, wherein, when the information on the piece of music stored in the internal memory is to be moved to the acoustic information downloading device, the information on the piece of music stored in the internal memory is moved to an external device, and the information on the piece of music stored in the external device is moved to the acoustic information downloading device.

* * * * *